(12) United States Patent
Maddock et al.

(10) Patent No.: US 6,345,602 B1
(45) Date of Patent: Feb. 12, 2002

(54) METHOD AND APPARATUS FOR CONTROLLING THE SPEED OF AN ENGINE

(75) Inventors: James B. Maddock, Washington; Fred Mehdian, Peoria; Anthony E. Sloan, Lacon; Rodrigo L. Sanchez, Edelstein; Darryl D. Baldwin, Lacon, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/458,282

(22) Filed: Dec. 10, 1999

(51) Int. Cl.$^7$ ............................ F02D 41/14; F02B 37/12
(52) U.S. Cl. ............................................. 123/352; 60/602
(58) Field of Search .............................. 123/352–357, 123/361; 60/602, 603

(56) References Cited

U.S. PATENT DOCUMENTS

| | | | |
|---|---|---|---|
| 4,257,361 A | * 3/1981 | Kasiewicz | ................. 123/352 |
| 4,477,875 A | * 10/1984 | Suzuki et al. | ............. 60/602 X |
| 4,493,303 A | * 1/1985 | Thompson et al. | ..... 123/352 X |
| 4,640,244 A | * 2/1987 | Koike et al. | ............. 123/585 X |
| 5,137,001 A | 8/1992 | Taniguchi | .................... 123/494 |
| 5,313,798 A | 5/1994 | Yoshioka et al. | ............. 60/600 |
| 5,351,486 A | 10/1994 | Yoshioka et al. | ............. 60/612 |
| 5,590,630 A | * 1/1997 | Kurihara et al. | ....... 123/339.17 |
| 5,724,813 A | 3/1998 | Fenelon et al. | ................ 60/606 |
| 5,816,047 A | 10/1998 | Zurlo | .......................... 60/602 |
| 6,012,289 A | * 1/2000 | Deckard et al. | ............. 60/602 |
| 6,035,825 A | * 3/2000 | Worth et al. | ................ 123/357 |

* cited by examiner

*Primary Examiner*—Tony M. Argenbright
(74) *Attorney, Agent, or Firm*—W. Bryan McPherson, III; R. Carl Wilbur

(57) ABSTRACT

The present invention provides a method and apparatus for controlling the speed of an engine. The engine has an associated turbo charger and a throttle. The method includes the steps of determining a load characteristic of the engine, determining a change in said load characteristic, and controlling the engine in response to said load change.

29 Claims, 4 Drawing Sheets

Fig-2-

METHOD AND APPARATUS FOR CONTROLLING THE SPEED OF AN ENGINE

TECHNICAL FIELD

This invention relates generally to an engine, and more particularly, to a method and apparatus for controlling the speed of an engine.

BACKGROUND ART

Electronic control of fuel systems on an engine generally provide a determined amount of fuel to the engine in response to a desired and an actual engine speed. In one embodiment, the engine may have an associated turbocharger. When the load on the engine is quickly removed, an engine overspeed or turbo surge may result. That is, when the load is removed suddenly from the engine, the engine may rapidly accelerate above the desired engine speed. The speed of the engine and the turbocharger may begin to surge uncontrollably. Current fuel control systems may be unable to stabilize the engine speed, in part, because of the sudden and significant difference between the desired and actual engine speed.

The present invention is directed to overcoming one or more of the problems identified above.

DISCLOSURE OF THE INVENTION

In one aspect of the present invention, a method for controlling the speed of an engine is disclosed. The engine has an associated turbocharger and a throttle. The method includes the steps of determining a load characteristic of the engine, and controlling the engine in response to the load characteristic.

In another aspect of the present invention, an apparatus for controlling the speed of an engine is disclosed. The apparatus comprises a speed sensor adapted to sense a characteristic of the engine and responsively generate a speed signal indicative of the speed of the engine, and a controller adapted to receive the speed signal, determine a load characteristic of the engine, determine a change in the load characteristic, and control the engine in response to the load change.

BEST MODE FOR CARRYING OUT THE INVENTION

Figure 1:
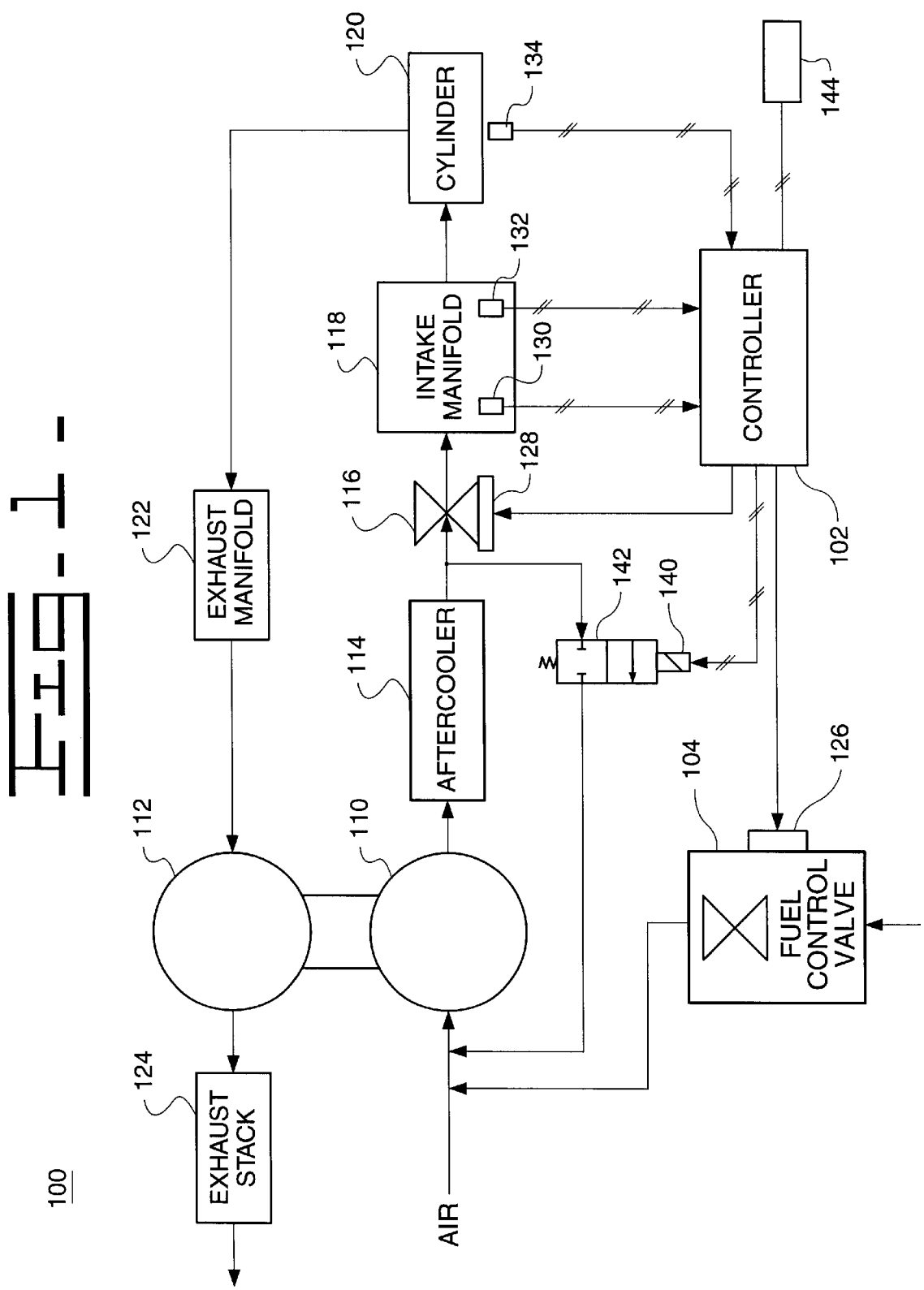
FIG. 1 is a high level diagram of one embodiment of a fuel system.

The present invention provides a method and apparatus for controlling the speed of an engine. In the preferred embodiment, the engine has an associated turbocharger and a throttle. FIG. 1 is an illustration of one embodiment of a fuel system 100. A fuel control valve 104, such as a TecJet, enables fuel to flow to a compressor 110. The resulting air/fuel mixture passes through an aftercooler 114. A throttle 116 controls the volume of air/fuel mixture that flows into an intake manifold 118. The manifold 118 delivers the fuel to one or more cylinders 120. FIG. 1 illustrates one cylinder 120 for exemplary reasons, however it is known in the art to deliver fuel from the manifold 118 to multiple cylinders 120. The exhaust from the cylinders 120 passes through the exhaust manifold 122, the turbine 112, and the exhaust stack 124. A bypass control valve 142 may be connected between the output of the aftercooler 114 and the input of the compressor 110.

A controller 102 may receive inputs from one or more sensors. The controller 102 controls the speed of the engine by determining a load characteristic of the engine, determining a change in the load characteristic, and controlling the engine in response to the load change. In one embodiment, the controller determines at least one of a throttle command, fuel command, and bypass valve position, in response to the load change. When a throttle command, fuel command, and/or bypass valve position are determined, the appropriate commands are delivered to a throttle actuator 128, a fuel actuator 126, and a bypass valve actuator 140, respectively. The throttle actuator 128 will control the position of the throttle 116 in response to the throttle command. The fuel valve actuator 126 will control the position of the fuel control valve 104 in response to the fuel command. The bypass valve actuator 140 will control the position of the bypass valve 142 in response to the bypass valve command.

In one embodiment, an actual engine speed sensor 134 may be included in the fuel system 100. The actual engine speed sensor 134 is attached to the engine and electrically connected to the controller 102. The speed sensor 134 may be any type of sensor that produces an electrical signal indicative of the engine speed. For example, in one embodiment, the speed sensor 134 is mounted on an engine flywheel housing (not shown) and produces a digital speed signal in response to the speed of the flywheel mounted on an engine crankshaft (not shown).

In the preferred embodiment, the fuel system includes a load sensor 144 adapted to sense a characteristic of the load of the engine, and responsively deliver a load signal to the controller In one embodiment, the load sensor 144 may be attached to the engine and adapted to detect the external load being applied to the engine. For example, the load sensor 144 may be attached to an engine and sense a characteristic of the external load in kilowatts, amps, or volts, that is being applied to the engine. The load signal is then delivered to the controller 102. In an alternative embodiment, the load of the engine may be determined using software. For example., the load may be determined in response to determining the amount of fuel being required by the engine.

Other sensors such as a pressure sensor 130, and/or temperature sensor 132 may be included in the fuel system 100. The variables sensed by these apparatus may be used by the controller 102 to determine a fuel command.

Figure 2:
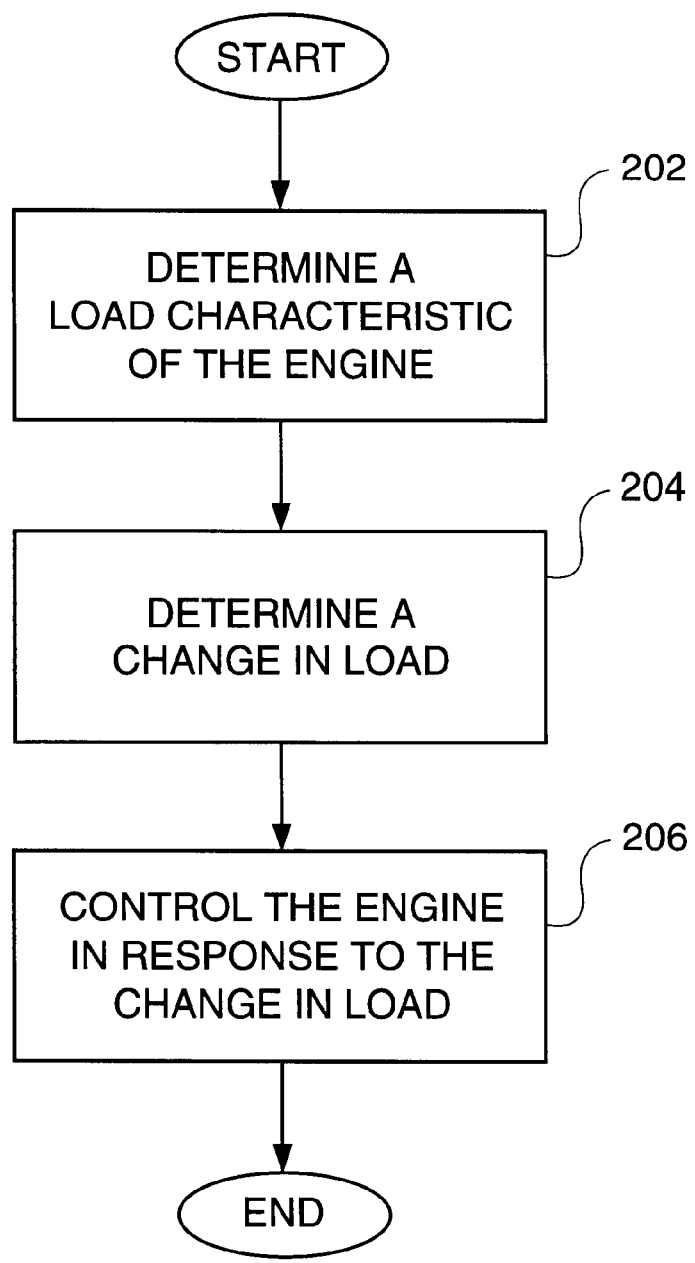
FIG. 2 is an illustration of one embodiment of a method of controlling the speed of an engine.

FIG. 2 illustrates one embodiment of the method of the present invention. The present invention includes a method for controlling the speed of an engine, including the steps of determining a load characteristic of the engine, determining a change in the load characteristic, and controlling the engine in response to the load change.

In a first control block 202, a load characteristic of the engine is determined. In the preferred embodiment, the load characteristic is the load of the engine. In one embodiment, a load sensor 144 may be used to sense a load characteristic of the engine, and deliver a signal indicative of the load characteristic to the controller 102. In the preferred embodiment the load characteristic is the actual load of the engine, e.g., the external load being applied to the engine. However, other techniques may be used to determine an engine load characteristic such as determining a load value in response to the fuel command. That is, the fuel command may be indicative of the external load applied to the engine.

In a second control block 204, a change in the engine load is determined. For example, the current engine load may be compared with a previous engine load. The comparison is indicative of a change in the engine load.

In a third control block 206, the engine is controlled in response to the load change. In one embodiment, the engine load is monitored to determine when an engine overspeed condition exists. The engine may then be controlled in response to the overspeed condition. In one embodiment, an engine overspeed condition may be determined in response to a change in the engine load over a time period. That is, when a change in engine load over a time period exceeds a threshold value, an overspeed condition may be determined to exist. For example, if the current sensed load drops below a previously sensed load by a threshold hold value within a specified time period, then an engine overspeed condition may be determined to exist. The time period may be dynamically determined or may be a predetermined value. The threshold may also either be a predetermined or dynamically determined value. For example, the threshold value may be dynamically determined in response to the magnitude of the engine load. A larger engine load may result in a larger threshold, or change in load value, which must be exceeded before an engine overspeed condition is determined to exist.

In an alternative embodiment, monitoring the change in engine load over a specified time period may indicate the likely occurrence of an engine overspeed condition. Therefore, the engine may be controlled in response to a likely overspeed condition, by monitoring the engine load.

In another alternative embodiment, the engine is controlled in response to the load change. The determined change in engine load is compared to a threshold, e.g., an overspeed threshold. The engine is then controlled in response to the comparison. If the magnitude of the load change does not exceed the overspeed threshold, then the engine is controlled in a normal manner, as discussed below. If the magnitude of the load change exceeds the overspeed threshold, then at least one of a fuel command, throttle command, and a bypass control command are determined in response to the load change, and specifically to the comparison of the load change to an overspeed threshold.

The engine may be controlled by determining at least one of a throttle command, fuel command, and a bypass control command in response to the load change. In the preferred embodiment, each of the throttle, fuel, and bypass valve, commands are controlled in response to the load change.

Figure 3:
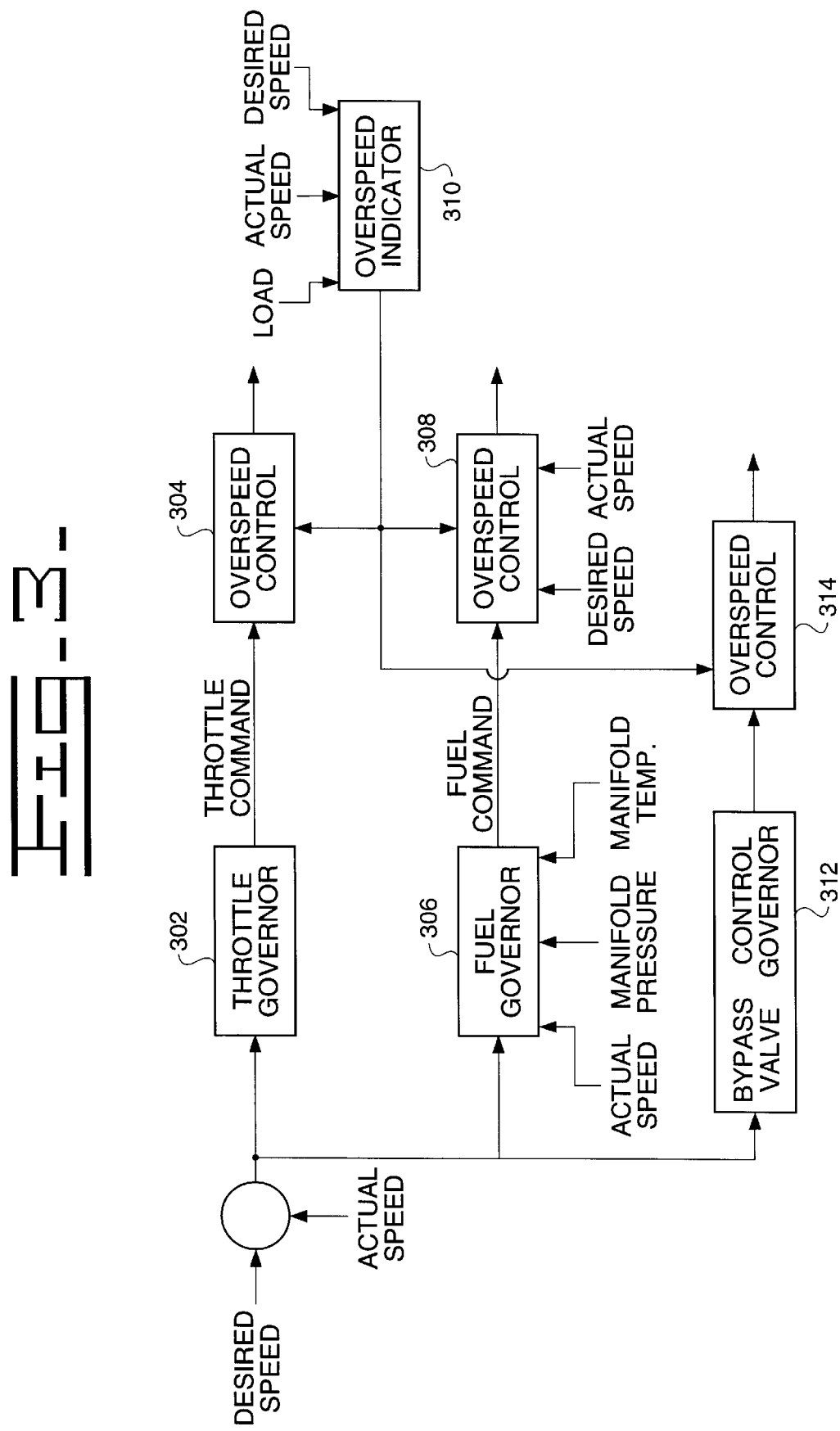
FIG. 3 is a functional block diagram of an system adapted to control the speed of an engine.

FIG. 3 illustrates one embodiment of a functional block diagram of the present invention. The initial fuel command generated by the fuel command governor 306 is passed to an overspeed control 308. If an overspeed condition does not exist, for example the load change does not exceed the overspeed threshold, then the initial fuel command passes through the overspeed control 308, unmodified, and is delivered to the fuel actuator 126.

An actual engine speed may be determined in response to the speed sensor signal generated by the speed sensor 134. A desired engine speed may be established either dynamically or based upon predetermined data. The desired engine speed may be dynamically established in response to receiving a desired engine speed signal. The desired speed signal may be representative of an input throttle command, from an operator for example, or by a cruise control system (not shown). Alternatively, the desired engine speed may be a predetermined value.

A throttle command is determined in order to control the amount of air/fuel mixture that flows into the manifold 118. The throttle command is determined in response to a comparison of the desired and actual engine speeds, e.g., the engine speed error. The throttle command may be determined utilizing a proportional, integral, derivative (PID) control algorithm. The PID control algorithm receives the engine speed error, and responsively determines a throttle command. PID control algorithms are well known in the art. An example of a PID control algorithm is shown below.

$$C_i = K_P e_i + K_I \sum_{j=0}^{i} e_j + K_D(e_i - e_{i-1})$$

Where $e_j$=error(desired speed−actual speed)
$C_i$=Command (Throttle) at time $t_i$
$K_P$=Proportional gain of the governor
$K_I$=Integral gain of the governor
$K_D$=Derivative gain of the governor In the preferred embodiment the PID algorithm is included within a throttle governor 304, as illustrated in FIG. 3. The throttle governor 304 receives the engine speed error and responsively determines a throttle command. In one embodiment, the throttle command is delivered to an overspeed control 304. If an overspeed condition does not exist, e.g., the load change is less than an overspeed threshold, then the throttle command is delivered to the throttle actuator 128 unmodified. If an overspeed condition does exist, the throttle command may be modified, as discussed below.

In the fuel control system 100, the controller 102 also controls the quantity of fuel flowing to the turbo 110. The controller 102 determines a fuel command, and delivers the command to the fuel control valve 126. The fuel command controls the amount of fuel to be delivered to the turbo 110, thereby controlling the ratio of air to fuel in the mixture which is delivered to the manifold 118. In the preferred embodiment, a fuel command is determined by a functional fuel governor 306, illustrated in FIG. 3. The fuel governor 306 may receive inputs from the speed sensor 134, pressure sensor 130, and temperature sensor 132, and responsively determine a fuel command. If an overspeed condition does not exist, e.g., the load change is less than an overspeed threshold, then the fuel command is delivered to the fuel actuator 126 unmodified. If an overspeed condition does exist, the fuel command may be modified, as discussed below.

In one embodiment, the bypass control valve 142 is either closed or open. Under normal operating conditions, e.g., an overspeed condition does not exist, the bypass control valve 142 is closed. When an overspeed condition does exist, the bypass control valve 142 may be commanded open. If an overspeed condition does not exist, e.g., the load change is less than an overspeed threshold, then the bypass valve command is delivered to the bypass valve 142 unmodified, and the valve 142 is commanded closed. If an overspeed condition does exist, the bypass valve command may be modified, as discussed below.

The functional diagram illustrated in FIG. 3 is for illustrative purposes only. The present invention may be functionally represented in many different manners. For example, the fuel governor 306, throttle governor 302, and bypass valve governors 312, may include the respective overspeed control blocks 304, 308, 314. The overspeed control blocks are developed in software and may be implemented with the governors or separately.

In one embodiment, an overspeed indicator 310 may be included to determine the existence of an overspeed condition, e.g., the load change exceeds an overspeed threshold. A signal indicative of whether an overspeed condition exist may be delivered to the overspeed controls 304, 308, 312. In one alternative embodiment, the load signal may be delivered directly to the overspeed control 304, 308, 312.

Figure 4:
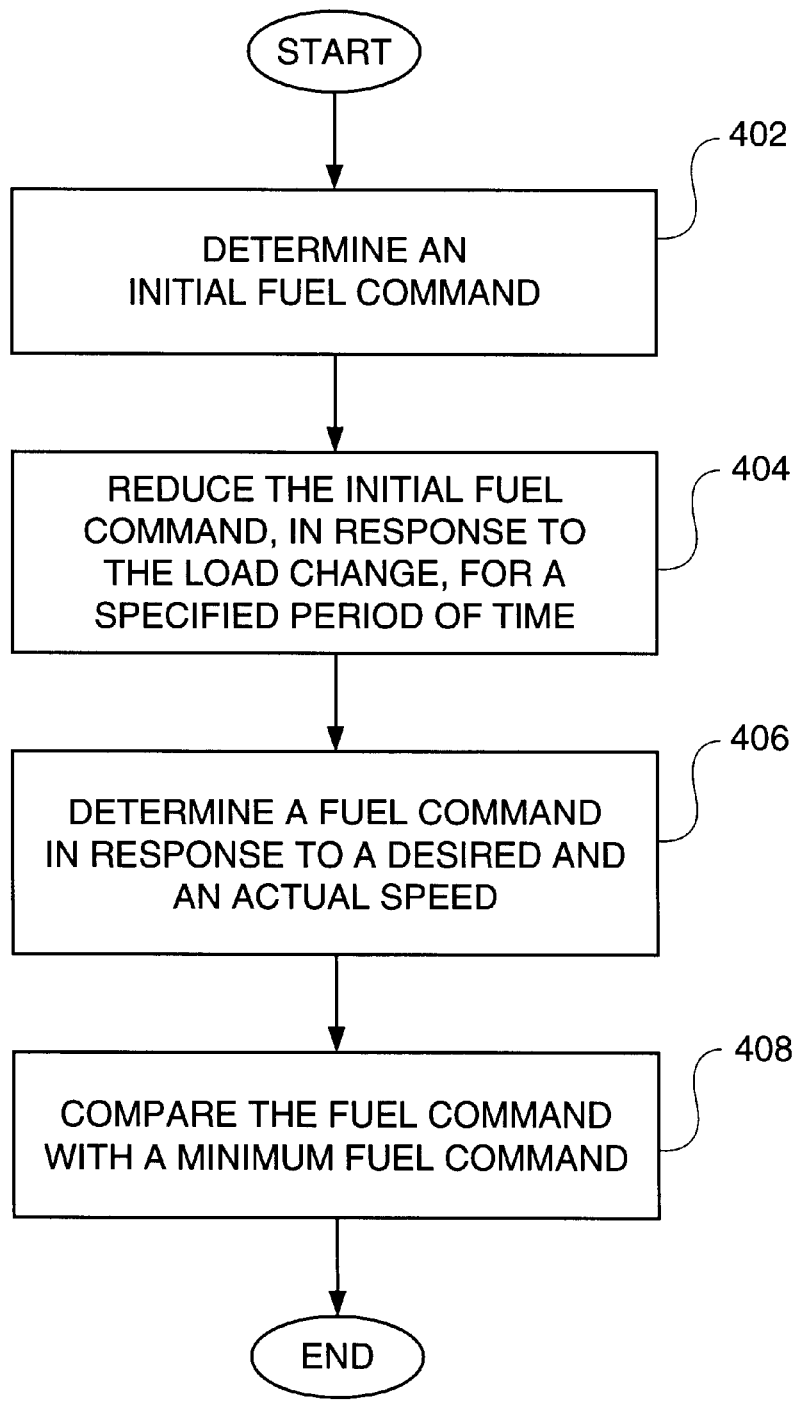
FIG. 4 is an illustration of one embodiment of a method for determining a fuel command in response to a load change.

FIG. 4 illustrates a flow diagram of one embodiment of determining a fuel command in response to the load change. In a first control block 402 an initial fuel command is determined. In a second control block 404, the initial fuel command is then modified in response to the change in load. In the preferred embodiment, the fuel command is reduced for a specified period of time in response to the load change. The reduced fuel command is then delivered to the fuel actuator 126 for the specified time period For example, in one embodiment:

Reduced Fuel Cmd=$X\%$*Initial Fuel Cmd

Where: X is a variable

In the preferred embodiment, X is a variable, the value of which is based upon the change in load. For example, the larger the change in load, the larger X is, and therefore, the smaller the reduced fuel command is. In an alternative embodiment, X may be a constant. The specific value of X may be dependent on the type of the engine used, and the type of performance desired. Once the reduced fuel command is determined, the reduced fuel command is delivered to the fuel actuator 126 for a specified time period. In one embodiment, the fuel command is delivered for a predetermined amount of time, e.g., one second. In an alternative embodiment, the time period may be dynamically determined. For example, the length of time the fuel command is reduced may be based on the magnitude of the load change, e.g., the severity of the overspeed condition. A larger load change may result in a longer time period for generating the reduced fuel command. The length of time the reduced fuel command is delivered may be engine and implementation dependent. After the specified time period expires control passes to control block 406.

In control block 406, a fuel command may be determined in response to a desired and an actual engine speed. An fuel command is generated by the fuel command governor 306 and passed to the overspeed control 308. The fuel command is modified in response to a desired and the actual engine speed. The desired and actual engine speeds are compared to determine an engine speed error. A modified fuel command is determined in response to the engine speed error. For example, a modified fuel command may be determined in response to multiplying the engine speed error by a constant and subtracting the sum from the fuel command received from the fuel governor 306. The constant may be a predetermined or dynamically determined value. In one embodiment, the constant is a proportional gain constant.

In a third control block 408, the modified fuel command is compared with a minimum fuel command. If the modified fuel command is less than the minimum fuel command then the modified fuel command is set equal to the minimum fuel command. The minimum fuel command may be either a predetermined or dyanmically determined value. For example, a minimum fuel command may be dynamically determined in response to the magnitude of the change in the load, and the load value before the load change occurred.

In the preferred embodiment, each of the steps illustrated in FIG. 4 is performed. For example, the fuel command is reduced in response to the change in engine load, for a specified time period. The reduced fuel command is delivered to the fuel actuator 126 for a specified period of time. After the specified time period, a fuel command is then modified in response to the desired and actual engine speeds. The modified fuel command is compared with minimum fuel command, and the greater of the modified and minimum fuel command is delivered to the fuel actuator 126. In an alternative embodiment, determination of the fuel command may include one or more of the described steps. For example, in one embodiment, when the magnitude of the load change exceeds an overspeed threshold, the fuel command may be reduced for a specified period of time. Alternatively, the fuel command may be determined in response to the desired and actual engine speeds, when an overspeed condition is determined to exist.

In one embodiment, a throttle command is determined in response to the load change. As illustrated in FIG. 3, a throttle command is determined by a throttle governor 302. In one embodiment, the throttle command, e.g., an intial throttle command, is then delivered to an overspeed control 304. If an overspeed condition does exist, e.g., the load change exceeds a threshold value, then the initial throttle command is reduced at a specified rate. For example, the initial, or base, throttle command generated by the throttle governor 302 is reduced at a specified rate, e.g., 10%/sec. Therefore, after one second, for example, the throttle command has been reduced to 90% of the initial value determined by the throttle governor 302. The reduced throttle command is delivered to the throttle actuator 128 during this time period. After two seconds, the reduced throttle command has been further reduced by 10% of the value of the initial, or base, throttle command. The reduction rate may be either predetermined or dynamically determined in response to the engine load or engine speed. In addition the reduction rate may remain the same, e.g., 10%/sec., or may vary depending on the length time the overspeed condition exists.

Once a reduced throttle command has been determined, the reduced throttle command is compared to the current throttle command received by the throttle governor 302. If the reduced throttle command is greater than the current throttle command, the reduced throttle command is sent to the throttle actuator 128. If the reduced throttle command is not greater than the current throttle command, then the current throttle command is delivered to the actuator 128.

The reduction in throttle command throttle command continues until the overspeed condition is resolved.

In one embodiment, when an overspeed condition exist, the bypass control valve 142 is opened for a specified time period, e.g., one second The length of time the valve 142 is open may be implementation dependent. In addition, the length of time the valve is opened may be a predetermined, or dynamically determined value. If the value is dynamically determined, the value may be determined in response to the magnitude of the change in the load.

In an alternative embodiment, the bypass control valve 142 may be fully opened or partially opened for a specified amount of time when an overspeed condition exists. If the bypass control valve 142 was partially opened when no overspeed condition existed, then the valve position would be increased, e.g., further opened, when an overspeed condition is detected.

In one embodiment, once an engine overspeed condition is determined to exist, e.g., a load change exceeds an overspeed threshold, the engine speed is monitored to determine when the overspeed condition no longer exists, i.e., the engine overspeed condition is over. The actual engine speed is compared with a desired engine speed. An engine speed error may be determined in response to the comparison. If the absolute value of the engine speed error is less than an error threshold, then the overspeed status may be determined to no longer exist. The error threshold may be either a predetermined, or dynamically determined value.

When the overspeed condition is determined to no longer exists, e.g., the absolute value of the engine speed error is less than an error threshold, then the bypass valve is closed, if it is currently open, and the throttle, fuel, and bypass valve commands are determined by the throttle governor 302 and fuel governor 306 and bypass valve governor 312 respectively, and pass through the respective overspeed control blocks 304, 308, 314 unmodified.

As illustrated in FIG. 3, the fuel command, throttle command, and bypass control valve command may be determined independent of each other. In addition, the overspeed control functional blocks (304, 308, 314) may be included in the throttle governor 302, fuel governor 306, and bypass control valve governor 312 respectively.

INDUSTRIAL APPLICABILITY

The present invention provides a method and apparatus for controlling the speed of an engine. In the preferred embodiment, the engine has an associated turbo charger and a throttle. The method includes the steps of determining a load characteristic of the engine, determining a change in the load characteristic, and controlling the engine in response to the load change.

When a load is quickly removed from the engine, the desired engine speed is less than the actual engine speed. The fuel control system may attempt to compensate for the load reduction in a manner that results in speed oscillations and poor engine performance. For example, when an overspeed condition occurs, e.g., the desired engine speed is less than the actual engine speed, a fuel control system may attempt to greatly reduce, or close the throttle. However, when this is done the desired speed may soon be much greater than the actual speed The rapid speed changes due to the significant load changes may lead to overcompensation by the fuel system which may lead to speed instability or oscillations. Therefore, at least one of the fuel command, throttle command, and bypass control valve commands are modified in response to the change in load. In the preferred embodiment each of the commands is modified in response to the load change.

In the preferred embodiment, the fuel command, throttle command and bypass valve command continue to be modified in response to the load change until the overspeed condition has been resolved. In one embodiment, the overspeed condition is determined to be resolved in response to the desired and actual engine speeds. For example, the desired and actual engine speeds may be compared to determine an engine speed error. If the absolute value of the engine speed error is less than an error threshold, then the overspeed condition may be considered resolved, and the fuel, throttle, and bypass control valve commands may be determined as they were under normal operating conditions.

Other aspects, objects, and advantages of the present invention can be obtained from a study of the drawings, the disclosure, and the claims.

What is claimed is:

1. A method for controlling the speed of an engine having a turbocharger and a throttle, comprising the steps of:

determining a load characteristic of the engine;

determining a change in said load characteristic;

controlling the engine in response to said load change; and determining when an engine overspeed condition exist in response to said load change.

2. A method, as set forth in claim 1, wherein the step of controlling the engine further comprises the step of controlling the engine in response to said overspeed condition.

3. A method, as set forth in claim 2, wherein the step of controlling the engine further comprises the step of determining a throttle command in response to said load change.

4. A method, as set forth in claim 2, including the step of determining a fuel command in response to said load change.

5. A method, as set forth in claim 1, wherein the step of determining when an engine overspeed condition exist includes the step of determining an overspeed condition exists when said load change occurs over a time period.

6. A method, as set forth in claim 5, wherein said time period is one of a predetermined time period and a dynamically determined time period.

7. A method, as set forth in claim 6, wherein said load change exceeds a threshold.

8. A method, as set forth in claim 7, wherein said threshold is one of a predetermined threshold and a dynamically determined threshold.

9. A method, as set forth in claim 2, further comprising the steps of:

determining an actual engine speed;

determining a desired engine speed; and determining said overspeed condition is over in response to said desired and said actual engine speed.

10. A method, as set forth in claim 2, wherein said engine includes a turbo-compressor having a bypass valve, and wherein the step of controlling the speed of said engine further comprises the steps of:

determining a throttle command in response to said overspeed condition;

determining a fuel command in response to said overspeed condition; and determining a position of the bypass valve in response to said overspeed condition.

11. A method, as set forth in claim 10, wherein the step of determining when an engine overspeed condition exist further includes the steps of:

determining an overspeed condition exists when said load change occurs over a time period; and determining said load change exceeds a threshold.

12. A method for controlling the speed of an engine having a turbocharger and a throttle, comprising the steps of:

determining a load characteristic of the engine, wherein said engine includes a turbo-compressor having a bypass valve;

and including the step of determining a position of the bypass valve in response to said load change;

determining a change in said load characteristic;

controlling the engine in response to said load change.

13. A method, as set forth in claim 12, wherein the step of determining said position of said bypass valve further comprises the step of opening said bypass valve for a time period.

14. A method, as set forth in claim 13, wherein said time period is one of a predetermined time period and a dynamically determined time period.

15. A method for controlling the speed of an engine having a turbocharger and a throttle, comprising the steps of:
   determining a load characteristic of the engine;
   determining a change in said load characteristic;
   controlling the engine in response to said load change; and
   determining a fuel command in response to said load change;
   wherein the step of determining a fuel command further comprises the steps of:
   determining an initial fuel command;
   reducing said initial fuel command in response to said load change for a time period.

16. A method, as set forth in claim 15, wherein the step of determining a fuel command, further comprises the steps of:
   determining a desired engine speed;
   determining an actual engine speed;
   comparing said desired and said actual engine speed; and
   determining a modified fuel command in response to said reduced fuel command and said comparison.

17. A method, as set forth in claim 16, wherein the step of determining a fuel command further comprises the steps of:
   establishing a minimum fuel command; and
   comparing said modified fuel command with said minimum and setting said modified fuel command to said minimum when said modified fuel command is less than said minimum command.

18. A method, as set forth in claim 15, wherein said time period is one of a predetermined time period and a dynamically determined time period.

19. A method for controlling the speed of an engine having a turbocharger and a throttle, comprising the steps of:
   determining a load characteristic of the engine;
   determining a change in said load characteristic;
   controlling the engine in response to said load change; and
   determining a fuel command in response to said load change;
   wherein the step of determining a fuel command, further comprises the steps of:
   determining a desired engine speed;
   determining an actual engine speed;
   comparing said desired and said actual engine speed; and
   determining a fuel command in response to an initial fuel command and said comparison.

20. A method for controlling the speed of an engine having a turbocharger and a throttle, comprising the steps of:
   determining a load characteristic of the engine;
   determining a change in said load characteristic;
   controlling the engine in response to said load change; and
   determining a fuel command in response to said load change;
   wherein the step of determining a fuel command further comprises the steps of:
   establishing a minimum fuel command;
   determining said fuel command; and
   comparing said fuel command with said minimum and setting said fuel command to said minimum when said fuel command is less than said minimum command.

21. A method for controlling the speed of an engine having a turbocharger and a throttle, comprising the steps of:
   determining a load characteristic of the engine;
   determining a change in said load characteristic; and
   controlling the engine in response to said load change, wherein the step of controlling the engine further comprises the step of determining a throttle command in response to said load change; and
   wherein the step of determining a throttle command further comprises the steps of:
   establishing an initial throttle command; and
   reducing said throttle command at a specified rate.

22. A method, as set forth in claim 21, wherein said specified rate is one of a predetermined rate and a dynamically determined rate.

23. A method, as set forth in claim 21, further comprising the steps of:
   comparing said reduced throttle command with said initial command and setting said reduced throttle command to said initial when said initial throttle command is less than said reduced command.

24. A method for controlling the speed of an engine having a turbocharger and a throttle, comprising the steps of:
   determining a load characteristic of the engine;
   determining a change in said load characteristic; and
   controlling the engine in response to said load change; and
   wherein the step of controlling the engine includes the steps of:
   comparing said load change with an overspeed threshold; and
   controlling the engine in response to said comparison.

25. An apparatus for controlling the speed of an engine having a turbocharger and a throttle, comprising:
   a speed sensor adapted to sense a characteristic of the engine and responsively generate a speed signal indicative of the speed of the engine; and
   a controller adapted to receive said speed signal, determine an actual speed in response to said speed signal, establish a desired speed, determine a load characteristic of said engine, determine a change in said load characteristic, and control the engine in response to said load change;
   wherein said controller determines a fuel command in response to said desired speed and said actual speed, and further wherein said controller determines said load characteristic in response to said fuel command.

26. An apparatus for controlling the speed of an engine having a turbocharger and a throttle, comprising:
   a speed sensor adapted to sense a characteristic of the engine and responsively generate a speed signal indicative of the speed of the engine; and
   a controller adapted to receive said speed signal, determine an actual speed in response to said speed signal, establish a desired speed, determine a load characteristic of said engine, determine a change in said load characteristic, and control the engine in response to said load change;
   wherein said controller is further adapted to determine an engine overspeed condition exists in response to said load change, and control said engine in response to said overspeed condition.

27. An apparatus, as set forth in claim 26, wherein said controller is further adapted to determine at least one of a throttle command, a fuel command and a bypass control valve command in response to said load change.

28. An apparatus, as set forth in claim 27, wherein said controller is further adapted to determine said overspeed condition is over in response to said desired engine speed and said actual engine speed.

29. A method for controlling the speed of an engine having a turbocharger and a throttle, comprising:

determining a load characteristic of the engine;

determining a change in said load characteristic;

controlling the engine in response to said load change;

determining when an engine overspeed condition exist in response to said load change; and determining a fuel command in response to said load change.

\* \* \* \* \*